May 21, 1957    L. GIARDINO ET AL    2,793,026
SPRING BALANCE FOR RAPID CONTINUOUS DOSING OR CONTROLLING
Filed June 24, 1953
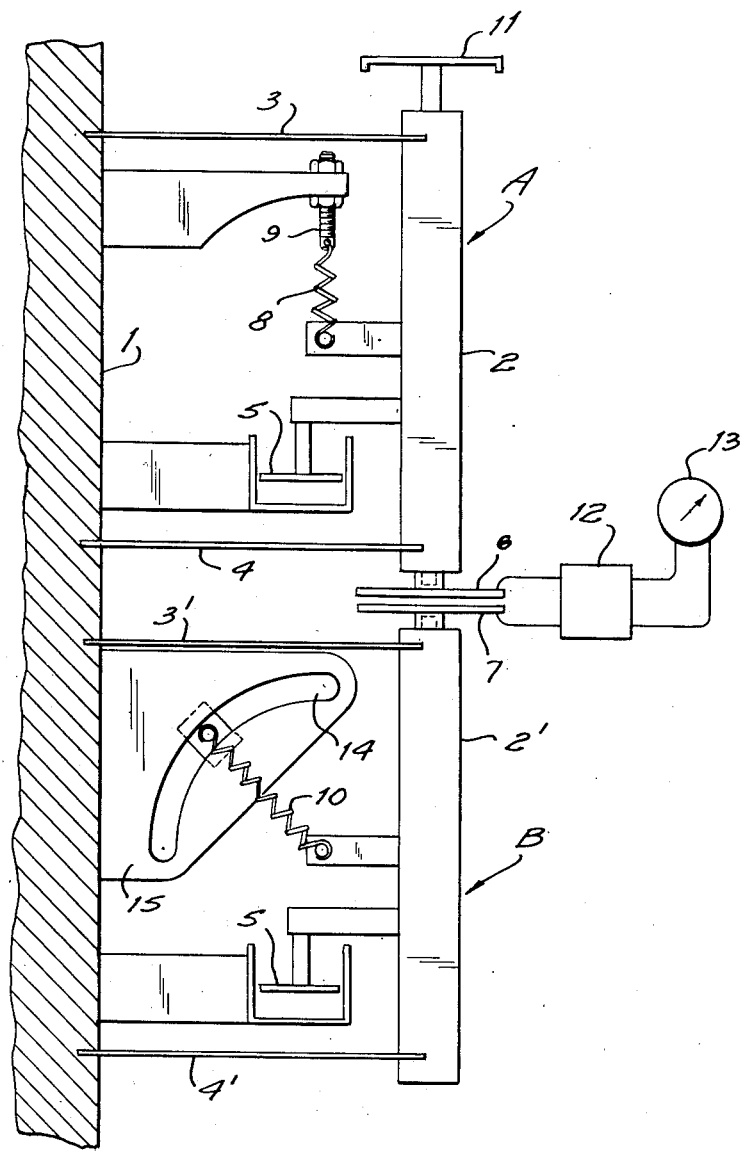
INVENTORS
Loris Giardino and Vittorio Faenza
BY Michael S. Stricker
Agt.

United States Patent Office 2,793,026
Patented May 21, 1957

2,793,026

SPRING BALANCE FOR RAPID CONTINUOUS DOSING OR CONTROLLING

Loris Giardino and Vittorio Faenza, Bologna, Italy

Application June 24, 1953, Serial No. 363,849

4 Claims. (Cl. 265—70)

The present invention relates to a weighing apparatus or a spring balance and more particularly to a weighing apparatus adapted for rapid weighing or checking operations.

One object of the present invention is to provide a weighing apparatus especially adapted for rapid weighing or checking operations, that is for approximately 3,600 operations per hour.

It is a further object of the present invention to provide a weighing apparatus the accuracy of which is not affected by vibration of the supporting structure on which the apparatus is mounted.

An additional object of the present invention is to construct such weighing apparatus without bearings or balancing knife edges so that the apparatus can be used for a practically unlimited number of operations without wear.

It is yet another object of the present invention to construct such a weighing apparatus out of a few and relatively simple parts so that the apparatus can be manufactured at a reasonable price.

With the above objects in view, the weighing apparatus of the present invention mainly consists of a base, two movable members mounted on said base, a scale pan connected to one of said members, flexing elements secured to said members and to said base for permitting movement of both of said members in the same given direction, said two movable members being disposed relative to one another so that the straight line joining the centers of gravity of said members is substantially parallel to said given direction of movement, means for measuring the change in position of one of said movable members with respect to the other of said members, and means for critically damping the movement of said movable members.

Preferably, the means for measuring the change in position of one of said movable members with respect to the other of said members include a pair of condenser plates arranged in operative relation to each other and respectively connected to said movable members.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing, in which:

The drawing is a schematic side view of the weighing apparatus.

Referring now to the drawing, the weighing apparatus of the present invention comprises a first scale means A mounted on a support 1 and a second scale means B mounted on the same support below and in close proximity to the first scale means A.

The first scale means A comprises a rigid movable vertical member 2 and a pair of resilient horizontal members 3 and 4 formed from leaf springs mounted at one of their ends on the support 1 and supporting at the other end opposite end portions of the vertical member 2. The member 2 carries at its upper end a scale pan or hopper 11.

The structure as described forms a parallelogram and if suitably dimensioned, the movable vertical member will perform a downward movement proportional to a load placed on the scale pan 11. This movement will be practically insensitive to moderate displacements of the point of application of the load on the scale pan 11.

The above described structure can furthermore be so dimensioned as to have at full load a very short period of natural oscillation and in practice the structure can be dimensioned that this period of oscillation will be from a few hundredths to a few tenths of a second.

In order to be able to use the weighing apparatus for very rapid operations, a suitable damping mechanism schematically illustrated at 5 is connected to the vertical member 2, which damping mechanism can be hydraulic, pneumatic or electromagnetic. Preferably this damping mechanism is made in such a way that the apparatus can be brought to critical damping, that means that the apparatus will after the load is applied obtain its deflected position or its static equilibrium substantially without oscillation in the shortest period of time. By the application of such a critical damping mechanism the weighing apparatus is especially adapted for very rapid operation.

The great readiness to operate can however be obtained only by constructing the flat springs 3 and 4 relatively rigid, that means that the sensitivity of the structure expressed by the ratio between displacement and load is very small.

Between the period of free oscillation T and the downward deflection F of the mobile member under the total load (that is, including the dead weight) exists a relationship $T=2\pi\sqrt{f/g}$ (where $g$ is the acceleration due to gravity). From this follows that if a period of free oscillation of one tenth of the second is desired, it is necessary to limit the downward movement of the member 2 under the total load to about 2.5 mm. For sensing load variations of one thousandth of the total load it is therefore necessary to detect displacements of 2.5 microns. The weighing apparatus of the present invention is adapted to check displacements in the order of some tenths to some hundredths of a micron.

To detect such minute displacements special means are of course required and additional means are necessary to eliminate the influence of vibrations to which the entire weighing apparatus is subjected. Such vibrations are especially present if the weighing apparatus is used in connection with automatic weighing machines in which such vibrations cannot be avoided even if very rigid supports are provided.

In the weighing apparatus of the present invention the influence of the vibrations of the support is eliminated by the arrangement of second scale means B, similar to the first scale means A, in close proximity and vertically below the scale means A. The load acts only on the scale means A while the displacement of the support will have equal effects on the scale means A and B under certain conditions which are further specified below. Load variations can therefore be measured by determining the relative displacement of the scale means A with respect to the scale means B and the obtained result will not be affected by the vibration of the support.

The scale means B are similarly constructed as the scale means A and comprises a rigid movable vertical member 2′, two resilient horizontal members 3′ and 4′ formed from leaf springs which are mounted at one end on the support 1 and respectively support at the other end opposite end portions of the vertical member 2′, and damping means 5′.

To measure the displacement of the two vertical members 2 and 2' relative to each other, two small condenser plates 6 and 7 are respectively fixed in parallel relationship to the lower end of the vertical member 2 and to the upper end of the vertical member 2'. The capacity of the condenser formed by the two plates 6 and 7 will therefore depend on the relative position of the two members 2 and 2' to each other and in order to detect very small variations of this capacity it is necessary to make the basic distance between the two plates fairly small.

According to the present invention a basic distance of 0.1 to 0.5 mm. is used and in order to regulate the distance between the two plates 6 and 7 in the rest position, the rest position of the member 2 can be adjusted by means of a coil spring 8 which is attached at one end by means of an arm to the member 2 and on the other end to an adjusting screw 9. This adjusting screw is attached by means of an arm to the support 1 and the distance between the two plates 6 and 7 can easily be adjusted within small variations by adjusting the position of the adjusting screw 9. If the basic distance between the two plates 6 and 7 is held to the dimension as specified above, relative displacements of the two plates to each other in the order of 0.1 to 0.5 micron can be detected if the basic capacity of the condenser is held to about ten times of one micromicrofarad. To detect variations of about one thousandth of this basic capacity high frequency circuits and electron tubes are used in a well known manner whereby these variations can be detected on the dial of an electrical instrument. The electrical equipment of the apparatus forms no part of the present invention and is only schematically illustrated in the drawing, in which an apparatus including the electron tubes and connected to the condenser plates 6 and 7 is schematically shown at 12 and the electrical measuring instrument is indicated at 13. Elements 12 and 13 constitute measuring means for measuring a change in capacitance of condenser plates 6 and 7.

In order to assure an equal displacement of the scale means A and B due to vibrations of the support, the direction of displacement of the two vertical members 2 and 2' have to be parallel to one another and substantially parallel to a line connecting the two centers of gravity of these two members. The features characterizing the dynamic behavior of the two scale means, that is, the mobile mass (including the load), the weighing sensitivity and the coefficient of damping should be proportional to one another. If very stringent working conditions are required, that is, when the mechanical coupling between the two mobile members due to the thin layer of air between the condenser plate 6 and 7 is not negligible, it is necessary to be able to equalize the sensitivity of the two scale means A and B. For this purpose a coil spring 10 is provided which is attached at one end to the vertical member 2' and with the other end adjustably fixed in a curved slot 14 provided in a plate 15 fastened to the support 1. By varying the position of the end of the spring 10 in the slot 14 the component of the spring force acting in the direction of the movement of the member 2' can be varied and thereby the required total sensitivity of the scale means B adjusted.

Small variations in the basic distance of the members 2 and 2' from the support due to aging of the springs or due to changes in temperature can be compensated by a suitable capacitor compensator without the need of any mechanical adjustment of the weighing apparatus.

The structure of the weighing apparatus is free of bearings and balancing knife edges and can therefore be used for a practically unlimited number of operations without wear.

It will be understood that each of the elements described above, or two or more together, may also find a useful application in other types of weighing apparatuses differing from the types described above.

While the invention has been illustrated and described as embodied in a weighing apparatus adapted for rapid weighing or checking, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features which, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a weighing apparatus, a base, two movable members mounted on said base, a scale pan connected to one of said members, flexing elements secured to said members and to said base and mounting both of said members for independent movement in the same given direction, said two movable members being disposed relative to one another so that the straight line joining the centers of gravity of said members is substantially parallel to said given direction of movement, means for measuring the change in position of one of said movable members with respect to the other of said members, and means for critically damping the movement of said movable members, said movable members and the flexing elements respectively connected thereto being so constructed that they have substantially identical periods of vibration so that upon vibration of the weighing apparatus, said members vibrate substantially equally and substantially without changing their relative position.

2. A weighing apparatus comprising, in combination, vertical supporting means; a pair of scale means independently secured to said supporting means, each of said scale means comprising a movable vertical member, and a pair of resilient horizontal members mounted at one end thereof to said supporting means and supporting at the other end thereof the opposite end portions of said vertical member, one of said vertical members being arranged above and aligned with the other of said vertical members, said scale means being so constructed that they have substantially identical periods of vibration so that upon vibration of the apparatus, said vertical members vibrate substantially equally and substantially without changing their relative position; means for receiving an object to be weighed secured to said one of said vertical members; a first condenser plate mounted to the bottom end of said one of said vertical members; and a second condenser plate mounted to the top end of said other of said vertical members, whereby when an object to be weighed is received by said means for receiving an object to be weighed said one vertical member is displaced relative to said other vertical member and the capacitance of said two condenser plates changes, said change in capacitances being an indication of the weight of said object.

3. An arrangement as set forth in claim 2 and further including damping means operatively associated with each of said vertical members for rapidly damping the movements thereof.

4. A weighing apparatus comprising, in combination, vertical supporting means; a pair of scale means independently secured to said supporting means, each of said scale means comprising a movable vertical member, and a pair of relatively stiff, horizontal flat spring members mounted at one end thereof to said supporting means and supporting at the other end thereof the opposite end portions of said vertical member, one of said vertical members being arranged above and aligned with the other of said vertical members, said scale means being so constructed that they have substatnially identical periods of vibration so that upon vibration of the apparatus, said vertical members vibrate substantially equally and substantially without changing their relative position; means for receiving an object to be weighed secured to said one of said vertical members; a first condenser plate mounted to the bottom end of said one of said vertical members; and a second condenser plate mounted to the top end of said other of said vertical members, whereby when an object to be weighed is received by said means for receiving an object to be weighed said one vertical member is displaced relative to said other vertical member and the capacitance of said two condenser plates changes, said change in capacitance being an indication of the weight of said object.

References Cited in the file of this patent

UNITED STATES PATENTS

| | | |
|---|---|---|
| 66,524 | Shaler | July 9, 1867 |
| 269,941 | Johannsen | Jan. 2, 1883 |
| 1,159,416 | Powers | Nov. 9, 1915 |
| 1,431,638 | Dowling | Oct. 10, 1922 |
| 2,001,836 | Craig | May 21, 1935 |
| 2,598,812 | Marco | June 3, 1952 |
| 2,623,636 | Pounds | Dec. 30, 1952 |
| 2,623,741 | Broekhuysen | Dec. 30, 1952 |
| 2,636,724 | Eacrett | Apr. 28, 1953 |

FOREIGN PATENTS

| | | |
|---|---|---|
| 6,586 | Great Britain | 1885 |